(12) United States Patent
Strachan et al.

(10) Patent No.: US 12,202,165 B2
(45) Date of Patent: Jan. 21, 2025

(54) HANDHELD PUNCH TOOL

(71) Applicant: MILWAUKEE ELECTRIC TOOL CORPORATION, Brookfield, WI (US)

(72) Inventors: Jacob C. Strachan, New Berlin, WI (US); Benjamin J. Boldt, Milwaukee, WI (US); Gerald A. Zucca, Milwaukee, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/516,573

(22) Filed: Nov. 21, 2023

(65) Prior Publication Data

US 2024/0083065 A1   Mar. 14, 2024

Related U.S. Application Data

(63) Continuation of application No. 17/500,506, filed on Oct. 13, 2021, now Pat. No. 11,820,038.

(60) Provisional application No. 63/194,435, filed on May 28, 2021, provisional application No. 63/091,372, filed on Oct. 14, 2020.

(51) Int. Cl.
  *B26F 1/34* (2006.01)
(52) U.S. Cl.
  CPC ...................... *B26F 1/34* (2013.01)
(58) Field of Classification Search
  CPC ............ B26F 1/34; B25F 5/001; B25F 5/008
  USPC .......................................................... 30/362
  See application file for complete search history.

(56) References Cited

U.S. PATENT DOCUMENTS

| | | |
|---|---|---|
| 3,906,266 A | 9/1975 | Cowman |
| 4,674,373 A | 6/1987 | Kuppinger |
| 4,696,211 A | 9/1987 | Bitzel |
| 4,748,744 A | 6/1988 | Turner |
| 5,735,669 A | 4/1998 | Niemela |
| 5,972,718 A | 10/1999 | Moghaddam et al. |
| 7,171,997 B2 | 2/2007 | Nishikawa et al. |
| 8,857,536 B2 | 10/2014 | Brennenstuhl et al. |
| 9,102,048 B2 | 8/2015 | Kuehne et al. |
| 9,314,908 B2 | 4/2016 | Tanimoto et al. |
| 9,545,712 B2 | 1/2017 | Kuehne et al. |
| 9,616,558 B2 | 4/2017 | Nishikawa et al. |
| 10,594,188 B2 | 3/2020 | Davidson et al. |

(Continued)

FOREIGN PATENT DOCUMENTS

| | | |
|---|---|---|
| CN | 86207364 U | 9/1987 |
| CN | 201361904 Y | 12/2009 |

(Continued)

OTHER PUBLICATIONS

International Search Report and Written Opinion for Application No. PCT/US2021/054761 dated Feb. 4, 2022 (12 pages).

*Primary Examiner* — Omar Flores Sanchez
(74) *Attorney, Agent, or Firm* — Michael Best & Friedrich LLP

(57) ABSTRACT

A handheld punch tool includes a housing, a die holder coupled to the housing, a die supported by the die holder, the die and the die holder defining a feed slot therebetween for receiving a workpiece to be cut, a punch configured to reciprocate within the die holder along a punch axis, an electric motor disposed within the housing and having a motor shaft configured to rotate about a motor axis to reciprocate the punch, and a flywheel mass coupled for co-rotation with the motor shaft about the motor axis.

20 Claims, 6 Drawing Sheets

(56) References Cited

U.S. PATENT DOCUMENTS

| | | | |
|---|---|---|---|
| 2001/0006780 A1 | 7/2001 | Boldt et al. | |
| 2017/0136599 A1 | 5/2017 | Aoki | |
| 2018/0154507 A1 | 6/2018 | Roehm | |
| 2018/0154508 A1 | 6/2018 | Roehm | |
| 2018/0297179 A1 | 10/2018 | Osada et al. | |
| 2019/0314968 A1* | 10/2019 | Bailey | B25F 5/008 |
| 2020/0262037 A1 | 8/2020 | Schneider et al. | |
| 2021/0187637 A1 | 6/2021 | Zornow et al. | |
| 2021/0315101 A1 | 10/2021 | Zucca | |
| 2021/0384793 A1 | 12/2021 | Bailey et al. | |
| 2022/0111548 A1 | 4/2022 | Strachan et al. | |
| 2022/0408655 A1 | 12/2022 | Zucca et al. | |

FOREIGN PATENT DOCUMENTS

| | | |
|---|---|---|
| DE | 19500215 C1 | 5/1996 |
| DE | 102012216496 A1 | 3/2014 |
| EP | 0208493 A2 | 1/1987 |
| EP | 1064124 B1 | 1/2004 |
| JP | H06168664 A | 6/1994 |
| WO | 2019028346 A1 | 2/2019 |
| WO | 2020173618 A1 | 9/2020 |

* cited by examiner

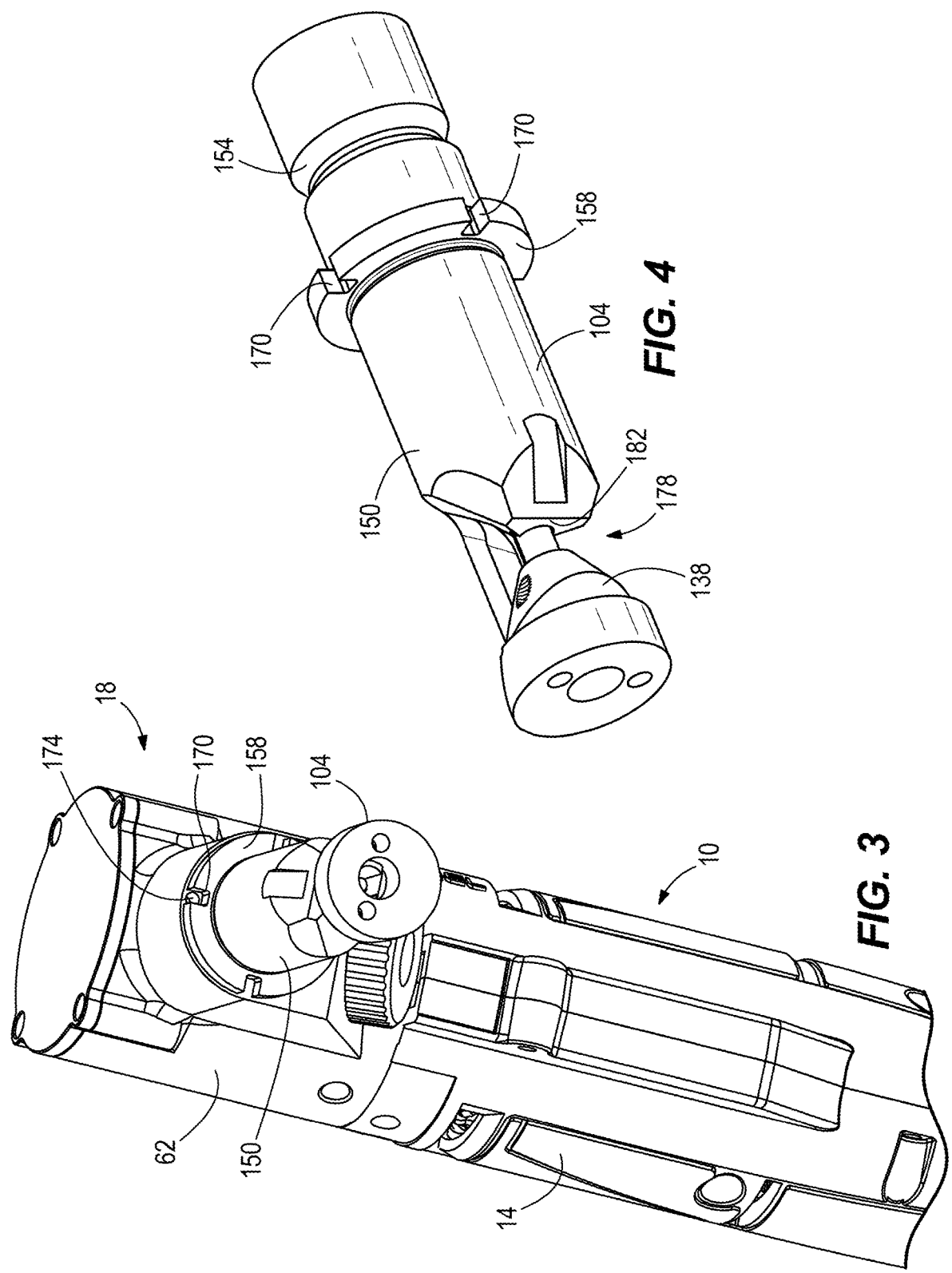

HANDHELD PUNCH TOOL

CROSS-REFERENCE TO RELATED APPLICATIONS

This application is a continuation of U.S. patent application Ser. No. 17/500,506, filed Oct. 13, 2021, issued as U.S. Pat. No. 11,820,083, which claims priority to U.S. Provisional Patent Application No. 63/091,372, filed on Oct. 14, 2020, and U.S. Provisional Patent Application No. 63/194,435, filed on May 28, 2021, the entire contents of all of which are incorporated herein by reference.

FIELD OF THE INVENTION

The present invention relates to power tools, and more specifically to handheld punch tools.

BACKGROUND OF THE INVENTION

Handheld reciprocating punch tools, also known as nibblers, operate by rapidly reciprocating a punch to cut through sheet metal, such as ductwork. Although nibblers are generally efficient and accurate tools for cutting through sheet metal, typical nibblers eject numerous small fragments during a cutting operation. These fragments can be sharp and difficult to clean up. In addition, typical nibblers are powered by an AC power source or compressed air, requiring a power cord or air hose that limits access and maneuverability. Finally, typical nibblers can only begin a cut on an edge. In other words, typical nibblers are not able to begin a cut in the middle of a sheet or on a closed duct, for example.

SUMMARY OF THE INVENTION

In some aspects, the techniques described herein relate to a handheld punch tool including: a housing; a die holder coupled to the housing; a die supported by the die holder, the die and the die holder defining a feed slot therebetween for receiving a workpiece to be cut; a punch configured to reciprocate within the die holder along a punch axis; an electric motor disposed within the housing and having a motor shaft configured to rotate about a motor axis to reciprocate the punch; and a flywheel mass coupled for co-rotation with the motor shaft about the motor axis.

In some aspects, the techniques described herein relate to a handheld punch tool, wherein the flywheel mass is a fan rotatable to generate an airflow for cooling the electric motor.

In some aspects, the techniques described herein relate to a handheld punch tool, wherein the fan has a rotational inertia of at least 6.0 kg-mm2.

In some aspects, the techniques described herein relate to a handheld punch tool, wherein the fan has a rotational inertia of at least 7.0 kg-mm2.

In some aspects, the techniques described herein relate to a handheld punch tool, wherein the fan is made of zinc.

In some aspects, the techniques described herein relate to a handheld punch tool, wherein the fan includes a cylindrical base, a plate extending from the cylindrical base, and a plurality of blades extending along an axial side of the plate.

In some aspects, the techniques described herein relate to a handheld punch tool, wherein the fan has a rotational inertia between 40% and 60% of a total rotational inertia of a rotating assembly including the fan and the motor shaft.

In some aspects, the techniques described herein relate to a handheld punch tool, further including a fan fixed to the motor shaft, wherein the flywheel mass is fixed to the motor shaft adjacent the fan.

In some aspects, the techniques described herein relate to a handheld punch tool, wherein the fan is made of plastic.

In some aspects, the techniques described herein relate to a handheld punch tool, wherein the flywheel mass has a rotational inertia equal to at least 50% of a total rotational inertia of a rotating assembly including the flywheel mass and the motor shaft.

In some aspects, the techniques described herein relate to a handheld punch tool, wherein the housing defines a longitudinal center axis, and wherein the housing includes a battery receptacle configured to receive a battery along a battery axis to provide power to the electric motor.

In some aspects, the techniques described herein relate to a handheld punch tool, wherein the battery is a rechargeable battery pack having a nominal output voltage of 18 Volts.

In some aspects, the techniques described herein relate to a handheld punch tool, further including a drive assembly supported within the housing and including a planetary transmission configured to receive torque from the motor shaft and an output shaft driven by the planetary transmission, wherein the planetary transmission and the output shaft are coaxial with the motor axis.

In some aspects, the techniques described herein relate to a handheld punch tool, wherein the flywheel mass has a rotational inertia of at least 6.0 kg-mm2.

In some aspects, the techniques described herein relate to a handheld punch tool including: a housing; a punch configured to reciprocate along a punch axis; an electric motor disposed within the housing and having a motor shaft configured to rotate about a motor axis to reciprocate the punch along the punch axis, wherein the motor axis is transverse to the punch axis; and a flywheel mass coupled for co-rotation with the motor shaft about the motor axis, wherein the flywheel mass has a rotational inertia of at least 6.0 kg-mm2.

In some aspects, the techniques described herein relate to a handheld punch tool, wherein the flywheel mass is a fan rotatable to generate an airflow for cooling the electric motor.

In some aspects, the techniques described herein relate to a handheld punch tool, wherein the flywheel mass has a rotational inertia between 40% and 60% of a total rotational inertia of a rotating assembly including the flywheel mass and the motor shaft.

In some aspects, the techniques described herein relate to a handheld punch tool, wherein the flywheel mass has a rotational inertia equal to at least 50% of a total rotational inertia of a rotating assembly including the flywheel mass and the motor shaft.

In some aspects, the techniques described herein relate to a handheld punch tool, wherein the housing includes a battery receptacle configured to receive a battery along a battery axis to provide power to the electric motor.

In some aspects, the techniques described herein relate to a handheld punch tool including: a housing; a punch configured to reciprocate along a punch axis; an electric motor disposed within the housing and having a motor shaft configured to rotate about a motor axis to reciprocate the punch along the punch axis, wherein the motor axis is transverse to the punch axis; a battery receptacle configured to receive a battery along a battery axis to provide power to the electric motor, wherein the battery axis is transverse to the punch axis; and a flywheel mass coupled for co-rotation with the motor shaft about the motor axis.

Other features and aspects of the invention will become apparent by consideration of the following detailed description and accompanying drawings.

BRIEF DESCRIPTION OF THE DRAWINGS

FIG. 3 is a perspective view illustrating a die holder of the punch tool of FIG. 1.

FIG. 4 is another perspective view of the die holder of the punch tool of FIG. 1.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
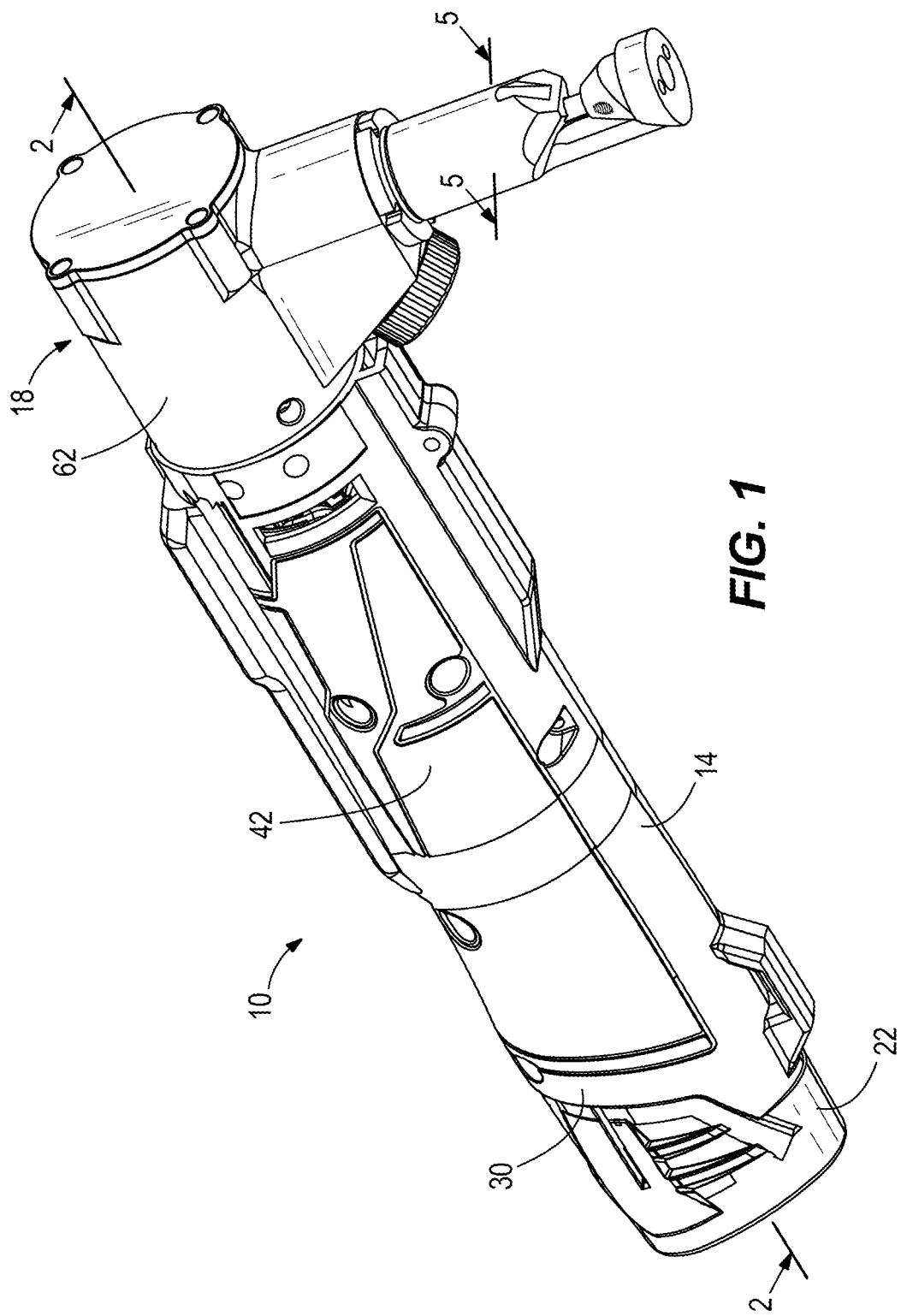
FIG. 1 is a perspective view of a punch tool according to an embodiment of the invention.
Figure 2:
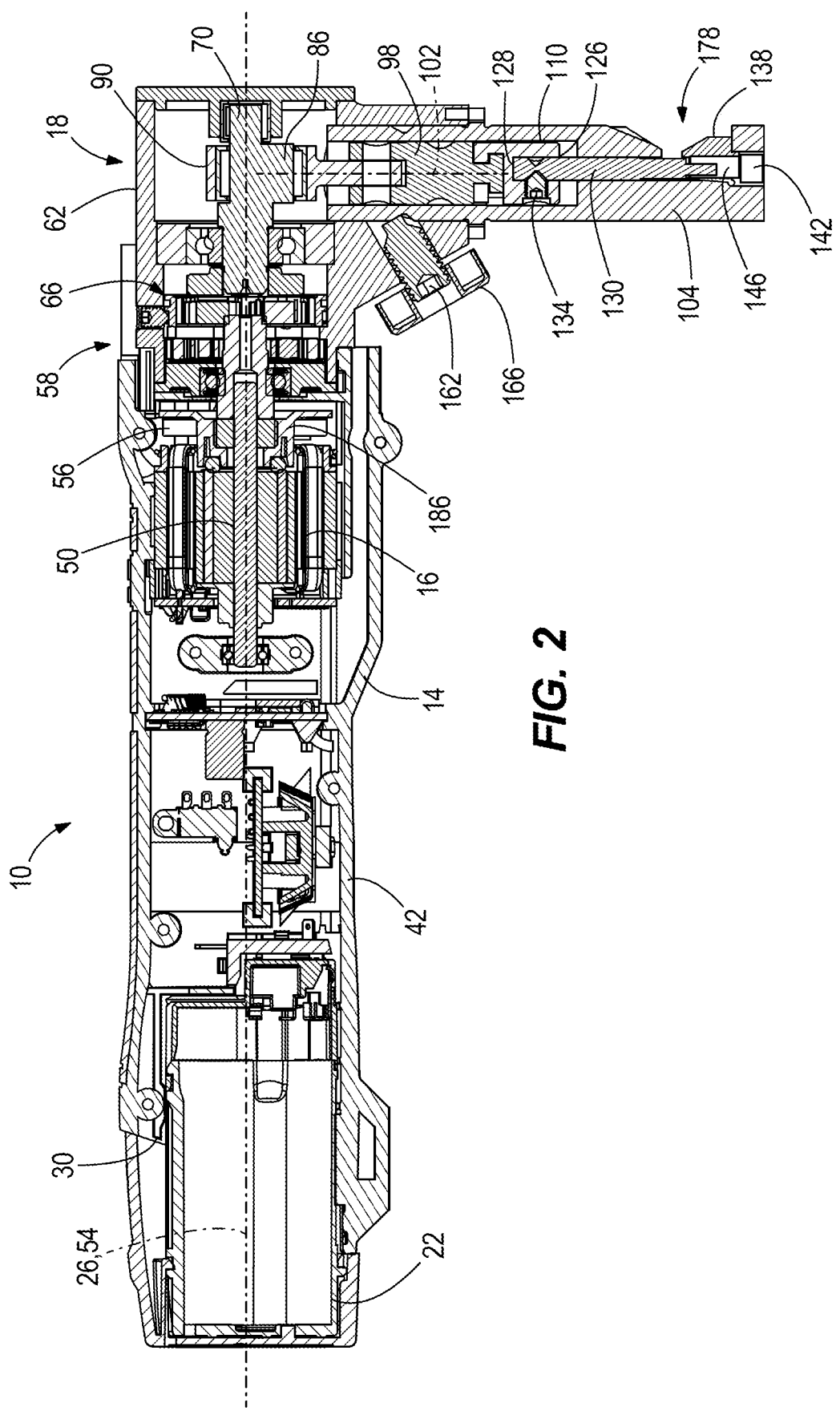
FIG. 2 is a cross-sectional view of the punch tool of FIG. 1, taken along line 2-2 in FIG. 1.

FIGS. 1-2 illustrate a handheld punch tool or nibbler 10 including a housing 14, an electric motor 16 (FIG. 2) supported within the housing 14, a cutting head 18 coupled to a front portion of the housing 14, and a battery pack 22 for supplying power to the motor 16 for operating the cutting head 18. The illustrated battery pack 22 is a rechargeable battery pack with a plurality of lithium-based cells. The battery pack 22 may have a nominal output voltage of about 12 Volts. In other embodiments, the battery pack 22 may have other nominal output voltages (e.g., about 18 Volts or more). The features and advantages of the nibbler 10 according to the present disclosure may also be applied to corded nibblers or pneumatic nibblers, however.

With reference to FIG. 2, the housing 14 defines a first axis or housing axis 26, which is a longitudinal axis that extends centrally through the housing 14 along its length. The battery pack 22 is partially insertable into a battery receptacle 30 located at a rear portion of the housing 14, opposite the cutting head 18. In the illustrated embodiment, the battery pack 22 is insertable into the battery receptacle 30 along the first axis 26 to couple the battery pack 22 to the battery receptacle 30. This arrangement provides the nibbler 10 with a compact, in-line arrangement that facilitates use of the nibbler 10 in tight spaces.

The illustrated housing 14 includes a handle portion 42 (i.e. a portion of the housing 14 configured to be grasped by an operator during operation of the nibbler 10) having a generally cylindrical shape. The housing axis 26 extends centrally through the handle portion 42. However, the housing 14 may have a variety of other constructions such that the housing axis 26 may not extend through the handle portion 42. For example, the housing 14 may be generally 'L' or 'T' shaped with the handle portion 42 formed as a pistol grip. In such embodiments, the housing axis 26 may not extend through the handle portion 42 but rather may extend through another portion of the housing 14 containing the motor 16.

An on/off switch (not shown) is located on the handle portion 42 for selectively electrically connecting the motor 16 and the battery pack 22 to provide DC power to the motor 16. The motor 16 is a brushless DC motor in the illustrated embodiment and has a motor shaft 50 (e.g., part of a rotor assembly) that is rotatable about a second axis or motor axis 54. The motor 16 is oriented such that the motor axis 54 is coaxial with the housing axis 26. As such, relationships described herein with reference to the motor axis 54 are equally applicable to the housing axis 26, and vice versa. However, in other embodiments, the motor axis 54 and the housing axis 26 may not be coaxial.

With continued reference to FIG. 2, the nibbler 10 includes a drive assembly 58 coupled to the motor shaft 50 and contained at least partially within a drive casing 62 of the cutting head 18. The drive assembly 58 includes a transmission 66 (e.g., a single or multi-stage planetary transmission, which may be shiftable to provide multiple speed/torque settings in some embodiments) that receives torque from the motor shaft 50 and an output shaft 70 driven by the transmission 66. The transmission 66 and the output shaft 70 are coaxial with the motor axis 54 in the illustrated embodiment; however, in other embodiments, the transmission 66 and/or the output shaft 70 may be oriented in other ways. In yet other embodiments, the output shaft 70 may be directly driven by the motor shaft 50.

Figure 5:
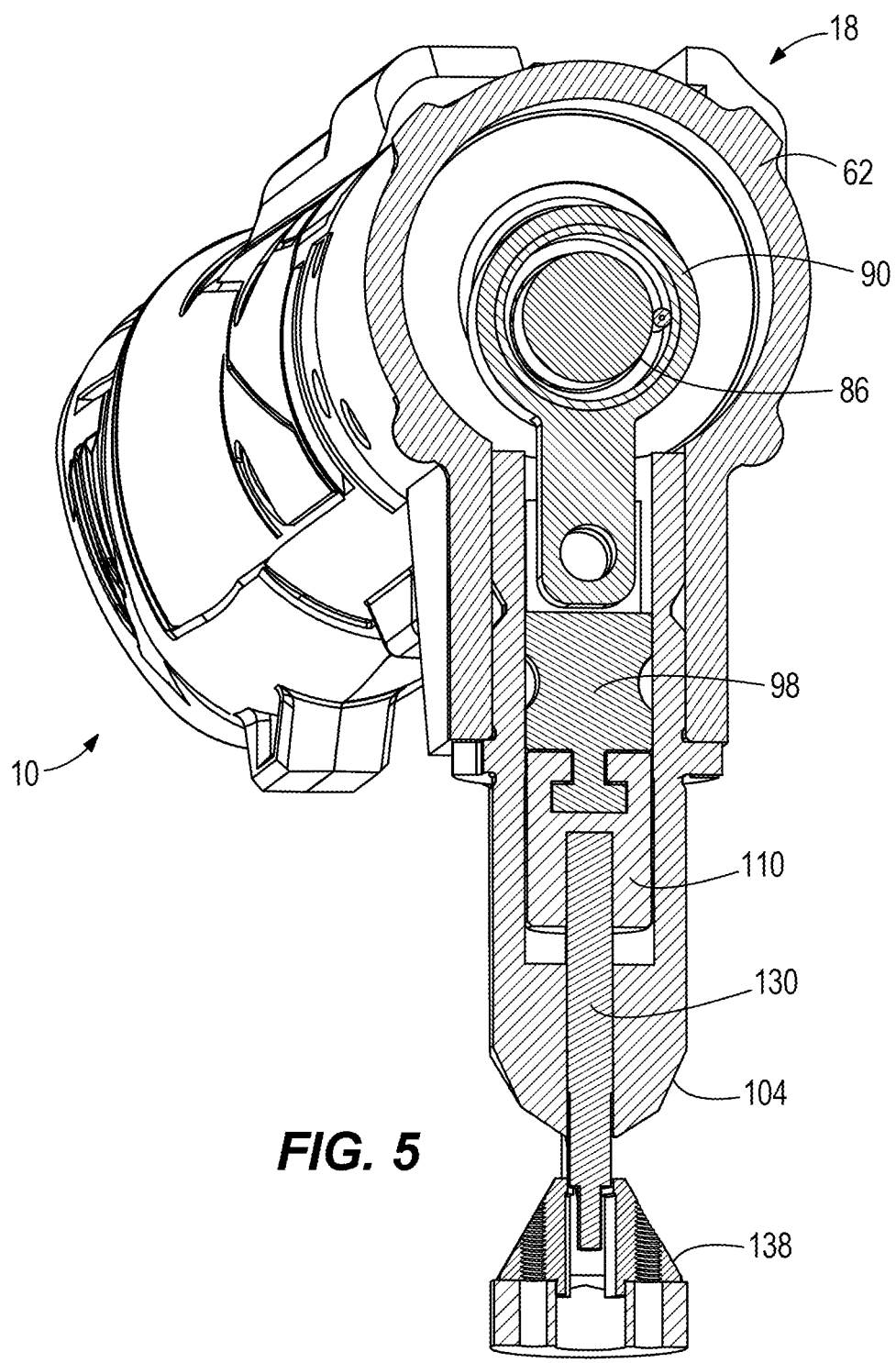
FIG. 5 is a cross-sectional view of the punch tool of FIG. 1, taken along line 5-5 in FIG. 1.

The output shaft 70 includes an eccentric 86 surrounded by a yoke 90 (FIGS. 2 and 5). The opposite end of the yoke 90 is pivotally coupled to a drive rod 98. Rotation of the output shaft 70 thus causes reciprocation of the drive rod 98 along a third axis 102 (FIG. 2). In the illustrated embodiment, the third axis 102 is transverse to the first and second axes 26, 54; however, the orientation of the third axis 102 may vary in other embodiments.

With continued reference to FIG. 2, the drive rod 98 is received within an upper portion of a die holder 104 that is coupled to the drive casing 62. The die holder 104 also houses a clamp assembly 110 coupled to the drive rod 98 opposite the yoke 90. The clamp assembly 110 includes a clamping recess 126 that receives a first end 128 of a punch 130. A set screw 134 engages a circumferential groove 136 (FIG. 6) in the punch 130 to removably couple the punch 130 to the clamp assembly 110 for reciprocating therewith. The punch 130 can thus be conveniently removed and replaced when worn, or to substitute the punch 130 for a punch having a different size or geometry.

The cutting head 18 also includes a die 138 defining a passageway 146 through which the punch 130 reciprocates in response to reciprocation of the drive rod 98 and clamp assembly 110. The die 138 is removably coupled to the die holder 108 by a second set screw 142, which, in the illustrated embodiment, is accessible from a bottom end of the die holder 108. Thus, the die 138, like the punch 130, can be conveniently removed and replaced when worn, or to substitute the die 138 for a die having a different size or geometry.

With reference to FIGS. 3-4, the die holder 104 in the illustrated embodiment includes a main body 150, an annular groove 154 recessed into the main body 150, and a flange 158 extending radially outwardly from the main body 150. The annular groove 154 receives the distal end of a set screw 162 (FIG. 2), which, in the illustrated embodiment, includes a knob 166 to facilitate hand adjustment of the set screw 162. The set screw 162 is oriented at an oblique angle relative to the axis 102, such that tightening the set screw 162 exerts both an axial and radial compressive force on the groove 154 of the main body 150 to secure the die holder 104 to the drive casing 62.

In the illustrated embodiment, the flange 158 of the die holder 104 includes a plurality of notches 170 extending radially inwardly from an outer circumferential edge of the flange 158. The notches 170 are configured to receive a pin or detent 174 extending from the drive casing 62 to define a plurality of rotational orientations of the die holder 104 relative to the drive casing 62. That is, loosening the set screw 162 allows the die holder 104 to be rotated relative to the drive casing 62, and each of the respective notches 170 can be aligned with the pin or detent 174 to set the die holder 104 in a predetermined rotational position. In the illustrated embodiment, the flange 158 includes four notches 170, each offset by 90 degrees, thereby providing the die holder 104 with four predetermined rotational positions. In other embodiments, the flange 158 may include any other number of notches 170 to provide a greater or lesser number of predetermined rotational positions.

Referring to FIG. 4, a feed slot 178 is defined between the die 138 and an opposing upper wall 182 of the die holder 104. Sheet material to be cut is fed into the feed slot 178 during operation and into the path of the reciprocating punch 130. By adjusting the orientation of the die holder 104 as described above, the feed slot 178 is repositionable to permit a user to hold the nibbler 10 in a desired orientation while guiding it along a cut line on a workpiece.

Figure 6:
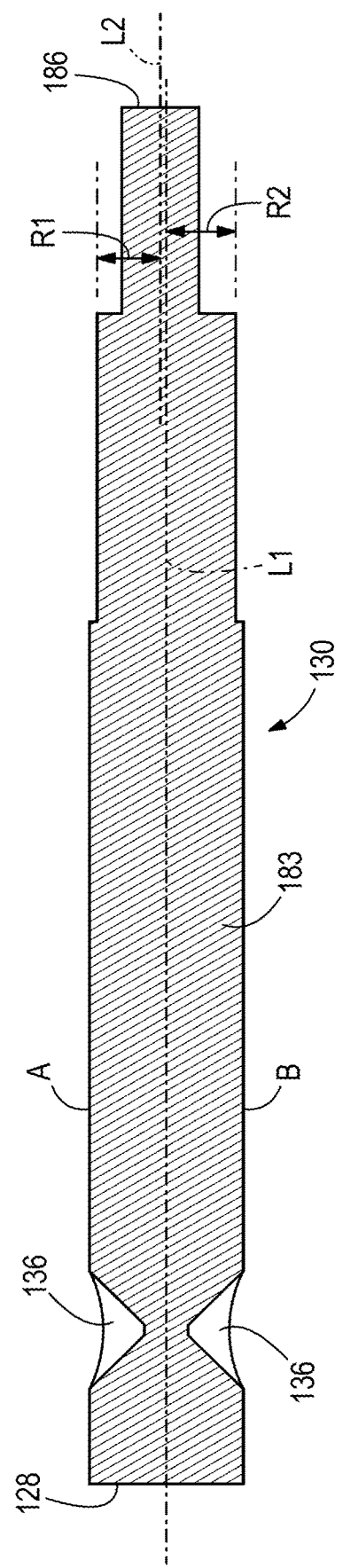
FIG. 6 is a cross-sectional view of a punch of the punch tool of FIG. 1.

With reference to FIG. 6, the punch 130 has a main body 183 that extends along a longitudinal center axis L1. The main body 183 has opposite radial sides A, B (each comprising, for example, a semi-cylindrical surface). A punch element 186 extends from the main body 183 along a second longitudinal center axis L2 that is parallel to the axis L1. As such, a radial distance R1 from the axis L2 to the first side A of the punch 130 is less than a radial distance R2 from the axis L2 to the opposite side B of the punch 130.

In operation of the nibbler 10, an operator depresses the switch to activate the motor 16, which continuously supplies torque to the drive assembly 58 via the motor shaft 50 (FIG. 2). The motor shaft 50 drives the output shaft 70 via the transmission 66. As the output shaft 70 rotates, the drive rod 98 of the cutting head 18 reciprocates along the third axis 102 due to the motion of the yoke 90. The drive rod 98 reciprocates the clamp assembly 110, which in turn reciprocates the punch 130 along longitudinal axis L1. The operator may then guide the cutting head 18 onto a piece of sheet metal or another workpiece to be cut. As the workpiece enters the feed slot 178 in the die holder 104, the punch element 186 of the reciprocating punch 130 repeatedly and incrementally shears small pieces of the workpiece against the die 138 to create an elongated cut.

The asymmetric position of the punch element 186 allows the punch 130 to provide two different depths of cut, depending on which radial side A, B of the punch 130 is facing the feed slot 178. In some embodiments, when the side A is facing the feed slot 178, the punch 130 may cut about 50% more sheet metal per stroke than when side B is facing the feed slot 178. For example, in the illustrated embodiment, the punch 130 may cut 1.2 mm of sheet metal per stroke when side A is facing the feed slot 178. And, when the side B is facing the feed slot 178, the punch 130 may cut 0.8 mm of sheet metal per stroke. Side A may therefore be used for faster cutting, whereas Side B may be used for more precise, finish cutting.

The die holder 104 may be rotated relative to the punch 130 (e.g., by loosening the set screw 162) to align the feed slot 178 with the respective sides A, B of the punch 130. In some embodiments, the die holder 104 may include two feed slots 178, such that the depth of cut may be changed depending on which direction the nibbler 10 is moved along the workpiece.

Figure 7:
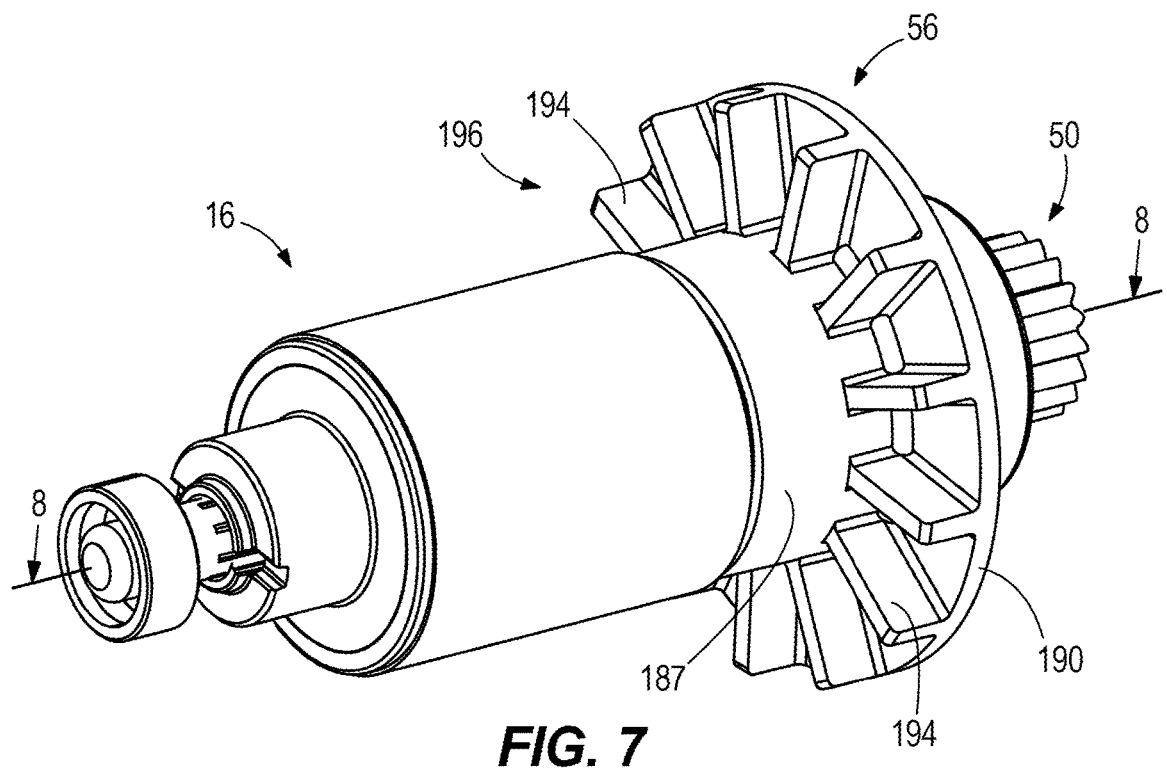
FIG. 7 is a perspective view illustrating a motor and fan of the punch tool of FIG. 1.

With references to FIGS. 2 and 7, the nibbler 10 further includes a fan 56 mounted to the rotor or motor shaft 50 for co-rotation therewith about the axis 54. The illustrated fan 56 includes a cylindrical base 187 having a central bore through which the motor shaft 50 is inserted. In some embodiments, the base 187 may be press-fit directly on the motor shaft 50. In other embodiments, the fan 56 may be supported on an intermediate connector affixed (e.g., press-fit) on the motor shaft 50.

The illustrated fan 56 includes a plate 190 and a plurality of blades 194 extending radially outwardly from the base 187. In the illustrated embodiment, the blades 194 extend along only one axial side of the plate 190. As such, the fan 56 has an intake side 196 configured to draw air toward the blades 194 in one axial direction. In the illustrated embodiment, the fan 56 is positioned in front of the motor 16, with the intake side 196 facing the motor 16. As such, the fan 56 is rotatable to draw air over the motor 16 to cool the motor 16, before discharging the air radially outwardly. In other embodiments, the fan 56 may include blades 194 on both sides of the plate 190 to draw air from both sides of the fan 56. In some embodiments, the fan 56 may be positioned on a rear side of the motor 16.

The illustrated fan 56 is made of a high-density material, such as zinc, to increase the inertia of the rotating components of the nibbler 10. More specifically, in the illustrated embodiment, the fan 56 has a rotational inertia equal to at least 50% of a total rotational inertia of a rotating assembly defined by the fan 56, the motor shaft 50, as well as any other components of the nibbler 10, such as one or more bushings, laminations, magnets, elastomeric pads, etc., which co-rotate together with the motor shaft 50 about the motor axis 54 in response to operation of the motor 16. In other embodiments, the fan 56 has a rotational inertia between 40% and 60% of the total rotational inertia of the rotating assembly. In some such embodiments, the fan 56 has a rotational inertia of at least 6.0 kg-mm$^2$. In other such embodiments, the fan 56 has a rotational inertia of at least 7.0 kg-mm$^2$.

In operation, the fan 56 rotates with the motor shaft 50 to generate a cooling airflow that cools the motor 16. The increased rotational inertia provided by the fan 56 allows the nibbler 10 to store kinetic energy in the rotating mass. The kinetic energy can then be used to assist in cutting heavier materials, reducing strain on the motor 16 and providing a smoother application of torque. This may also allow the size of the motor 16 and corresponding consumption of power from the battery pack 22 to be advantageously reduced.

Figure 8:
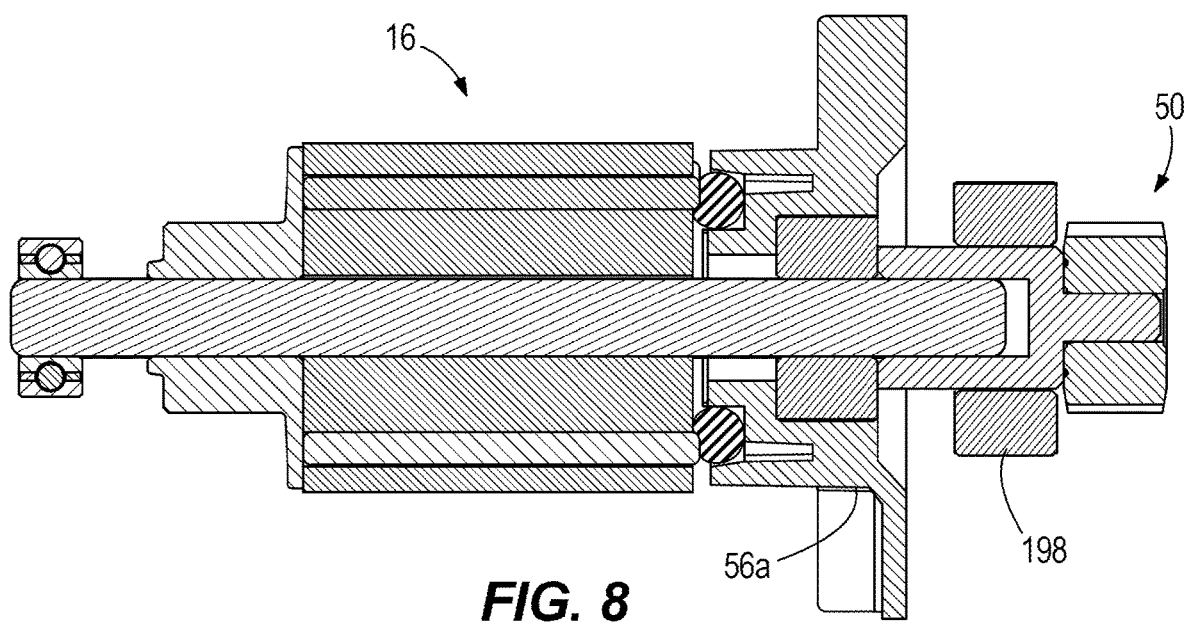
FIG. 8 is a cross-sectional view illustrating a motor and fan according to another embodiment, which may be incorporated into the punch tool of FIG. 1.

In another embodiment, illustrated in FIG. 8, the rotating assembly includes a fan 56a made of a lower-density material, such as plastic, and a flywheel mass 198 fixed to the motor shaft 50 adjacent the fan 576a. In such embodiments, the flywheel mass 198 has a rotational inertia equal to at least 50% of a total rotational inertia of the rotating assembly. The added inertia from the flywheel mass 198 provides similar benefits to the high-inertia fan 56 described above with reference to FIG. 7.

Various features of the invention are set forth in the following claims.

What is claimed is:

1. A handheld punch tool comprising:
a housing;
a die holder coupled to the housing;
a die supported by the die holder, the die and the die holder defining a feed slot therebetween for receiving a workpiece to be cut;
a punch configured to reciprocate within the die holder along a punch axis;
an electric motor disposed within the housing and having a motor shaft configured to rotate about a motor axis to reciprocate the punch; and
a flywheel mass coupled for co-rotation with the motor shaft about the motor axis,
wherein the flywheel mass is a fan rotatable to generate an airflow for cooling the electric motor, and
wherein the fan has a rotational inertia equal to at least 50% of a total rotational inertia of a rotating assembly including the fan and the motor shaft.

2. The handheld punch tool of claim 1, wherein the fan has a rotational inertia of at least 6.0 kg-mm$^2$.

3. The handheld punch tool of claim 2, wherein the fan has a rotational inertia of at least 7.0 kg-mm$^2$.

4. The handheld punch tool of claim 1, wherein the fan is made of zinc.

5. The handheld punch tool of claim 1, wherein the fan includes a cylindrical base, a plate extending from the cylindrical base, and a plurality of blades extending along an axial side of the plate.

6. The handheld punch tool of claim 1, wherein the housing defines a longitudinal center axis, and wherein the housing includes a battery receptacle configured to receive a battery along a battery axis to provide power to the electric motor.

7. The handheld punch tool of claim 6, wherein the battery is a rechargeable battery pack having a nominal output voltage of 18 Volts.

8. The handheld punch tool of claim 1, further comprising a drive assembly supported within the housing and including a planetary transmission configured to receive torque from the motor shaft and an output shaft driven by the planetary transmission, wherein the planetary transmission and the output shaft are coaxial with the motor axis.

9. A handheld punch tool comprising:
a housing;
a punch configured to reciprocate along a punch axis;
an electric motor disposed within the housing and having a motor shaft configured to rotate about a motor axis to reciprocate the punch along the punch axis, wherein the motor axis is transverse to the punch axis; and
a flywheel mass coupled for co-rotation with the motor shaft about the motor axis,
wherein the flywheel mass has a rotational inertia of at least 6.0 kg-mm$^2$.

10. The handheld punch tool of claim 9, wherein the flywheel mass is a fan rotatable to generate an airflow for cooling the electric motor.

11. The handheld punch tool of claim 9, wherein the flywheel mass has a rotational inertia between 40% and 60% of a total rotational inertia of a rotating assembly including the flywheel mass and the motor shaft.

12. The handheld punch tool of claim 9, wherein the flywheel mass has a rotational inertia equal to at least 50% of a total rotational inertia of a rotating assembly including the flywheel mass and the motor shaft.

13. The handheld punch tool of claim 9, wherein the housing includes a battery receptacle configured to receive a battery along a battery axis to provide power to the electric motor.

14. A handheld punch tool comprising:
a housing;
a punch configured to reciprocate along a punch axis;
an electric motor disposed within the housing and having a motor shaft configured to rotate about a motor axis to reciprocate the punch along the punch axis, wherein the motor axis is transverse to the punch axis;
a battery receptacle configured to receive a battery along a battery axis to provide power to the electric motor, wherein the battery axis is transverse to the punch axis; and
a flywheel mass coupled for co-rotation with the motor shaft about the motor axis,
wherein the flywheel mass has a rotational inertia between 40% and 60% of a total rotational inertia of a rotating assembly including the flywheel mass and the motor shaft.

15. The handheld punch tool of claim 8, wherein the fan is positioned between the motor and the planetary transmission.

16. The handheld punch tool of claim 15, wherein the fan includes a cylindrical base, a plate extending from the cylindrical base, and a plurality of blades extending along an axial side of the plate facing the electric motor.

17. The handheld punch tool of claim 9, further comprising a drive assembly supported within the housing and including a planetary transmission configured to receive torque from the motor shaft and an output shaft driven by the planetary transmission.

18. The handheld punch tool of claim 17, wherein the planetary transmission and the output shaft are coaxial with the motor axis.

19. The handheld punch tool of claim 17, wherein the flywheel mass is positioned between the motor and the planetary transmission.

20. The handheld punch tool of claim 14, further comprising a drive assembly supported within the housing and including a planetary transmission configured to receive torque from the motor shaft and an output shaft driven by the planetary transmission, wherein the flywheel mass is positioned between the motor and the planetary transmission.

* * * * *